US012785950B2

(12) United States Patent
Matthews, Jr.

(10) Patent No.: US 12,785,950 B2
(45) Date of Patent: Nov. 3, 2026

(54) GENERATING KEYS FOR A CLUSTER OF NODES IN A SINGLE SECURITY ASSOCIATION

(71) Applicant: ADVANCED MICRO DEVICES, INC., Santa Clara, CA (US)

(72) Inventor: Donald Matthews, Jr., Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 32 days.

(21) Appl. No.: 18/212,739

(22) Filed: Jun. 22, 2023

(65) Prior Publication Data

US 2024/0259194 A1 Aug. 1, 2024

Related U.S. Application Data

(60) Provisional application No. 63/442,288, filed on Jan. 31, 2023.

(51) Int. Cl.
*H04L 9/08* (2006.01)
*H04L 9/32* (2006.01)
*H04L 9/40* (2022.01)

(52) U.S. Cl.
CPC ........ *H04L 9/0861* (2013.01); *H04L 63/0428* (2013.01); *H04L 9/3242* (2013.01)

(58) Field of Classification Search
CPC .. H04L 9/0861; H04L 63/0428; H04L 9/3242
See application file for complete search history.

(56) References Cited

U.S. PATENT DOCUMENTS 10,146,703 B1 12/2018 Bono et al.
12,225,115 B2 * 2/2025 Le Saint ................ H04L 9/085
2004/0044891 A1 * 3/2004 Hanzlik ................ H04L 63/065 713/150
2012/0283010 A1 * 11/2012 Koerkel ................ H04L 9/0869 463/29
2014/0189365 A1 * 7/2014 Cox ........................ G06F 21/72 713/189
2015/0373691 A1 * 12/2015 Turon ..................... H04L 69/16 370/329
2015/0373752 A1 * 12/2015 Turon ................ H04W 12/069 370/254
2016/0277373 A1 * 9/2016 Murray ................ H04L 9/0637

(Continued)

OTHER PUBLICATIONS

Barker, Elaine "Recommendation for Key Management: Part 1—General", NIST Special Publication 800-57 Part 1, Rev. 5, 2020, 171 pages.

(Continued)

*Primary Examiner* — Techane Gergiso

(57) ABSTRACT

A computing node in a computing cluster includes at least a key generator and an encryption engine. The key generator implements a key derivation function and generates a first data encryption key based on a key derivation key. The key derivation key is a global security association encryption key shared by a plurality of nodes in the computing cluster. The first data encryption key is unique to a node pair comprising the first node and a second node of the plurality of nodes. The encryption engine encrypts a data packet using the first data encryption key.

22 Claims, 7 Drawing Sheets

(56) References Cited

U.S. PATENT DOCUMENTS

| | | | | |
|---|---|---|---|---|
| 2017/0019376 | A1* | 1/2017 | Hars | H04L 63/0428 |
| 2017/0195121 | A1* | 7/2017 | Frei | H04L 9/0825 |
| 2017/0323114 | A1* | 11/2017 | Egorov | H04L 63/0435 |
| 2018/0242379 | A1* | 8/2018 | Turon | H04W 12/35 |
| 2018/0254901 | A1* | 9/2018 | Egorov | H04L 9/0822 |
| 2019/0230072 | A1* | 7/2019 | Murray | H04L 63/061 |
| 2020/0053065 | A1* | 2/2020 | Wisniewski | H04L 63/06 |
| 2020/0106609 | A1* | 4/2020 | Osborn | H04L 9/0891 |
| 2020/0186351 | A1* | 6/2020 | Sullivan | H04L 63/0478 |
| 2020/0186531 | A1 | 6/2020 | Bugenhagen | |
| 2020/0235914 | A1* | 7/2020 | Zhang | H04L 9/0869 |
| 2021/0399880 | A1* | 12/2021 | Gupta | H04L 9/088 |
| 2022/0173894 | A1 | 6/2022 | Cain, Jr. et al. | |
| 2022/0360979 | A1* | 11/2022 | Santhana Krishnan | H04W 12/041 |
| 2022/0368632 | A1* | 11/2022 | Turon | H04L 45/7453 |
| 2022/0417015 | A1* | 12/2022 | Wang | H04L 9/0643 |
| 2023/0163958 | A1* | 5/2023 | Sheng | H04L 9/0838 713/171 |
| 2023/0188336 | A1 | 6/2023 | Matthews, Jr. | |
| 2024/0098489 | A1* | 3/2024 | Parkkila | H04W 12/0471 |

OTHER PUBLICATIONS

International Search Report and Written Opinion issued in Application No. PCT/US2024/013515, mailed May 29, 2024, 10 pages.

International Preliminary Report on Patentability for PCT/US2024/013515, 7 pages.

* cited by examiner

GENERATING KEYS FOR A CLUSTER OF NODES IN A SINGLE SECURITY ASSOCIATION

BACKGROUND

Data centers and high-performance computers typically include many thousands of nodes. Current security mechanisms generally require a unique set of keys per node pair. With these data centers, each node is required to store an equally large number of encryption keys and have the keys readily available for use (e.g., on-chip storage). Off-chip storage can be used, but the delay in obtaining the correct key for a pair of nodes leads to latency delays on the interface and potentially stalls the interface. Due to the delays related to external storage of keys, or large on-chip memory for performant operation, one proposed security mechanism is to allow multiple nodes (including all nodes) to use the same encryption key for all node communications. However, the use of a single key leads to multiple security concerns, including a potentially significant breach of data if the key becomes known, a loss of the ability to cut communication with a particular node since the node already knows the key, increased side-channel attacks against the key, and performant methods required to update the key on all nodes.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
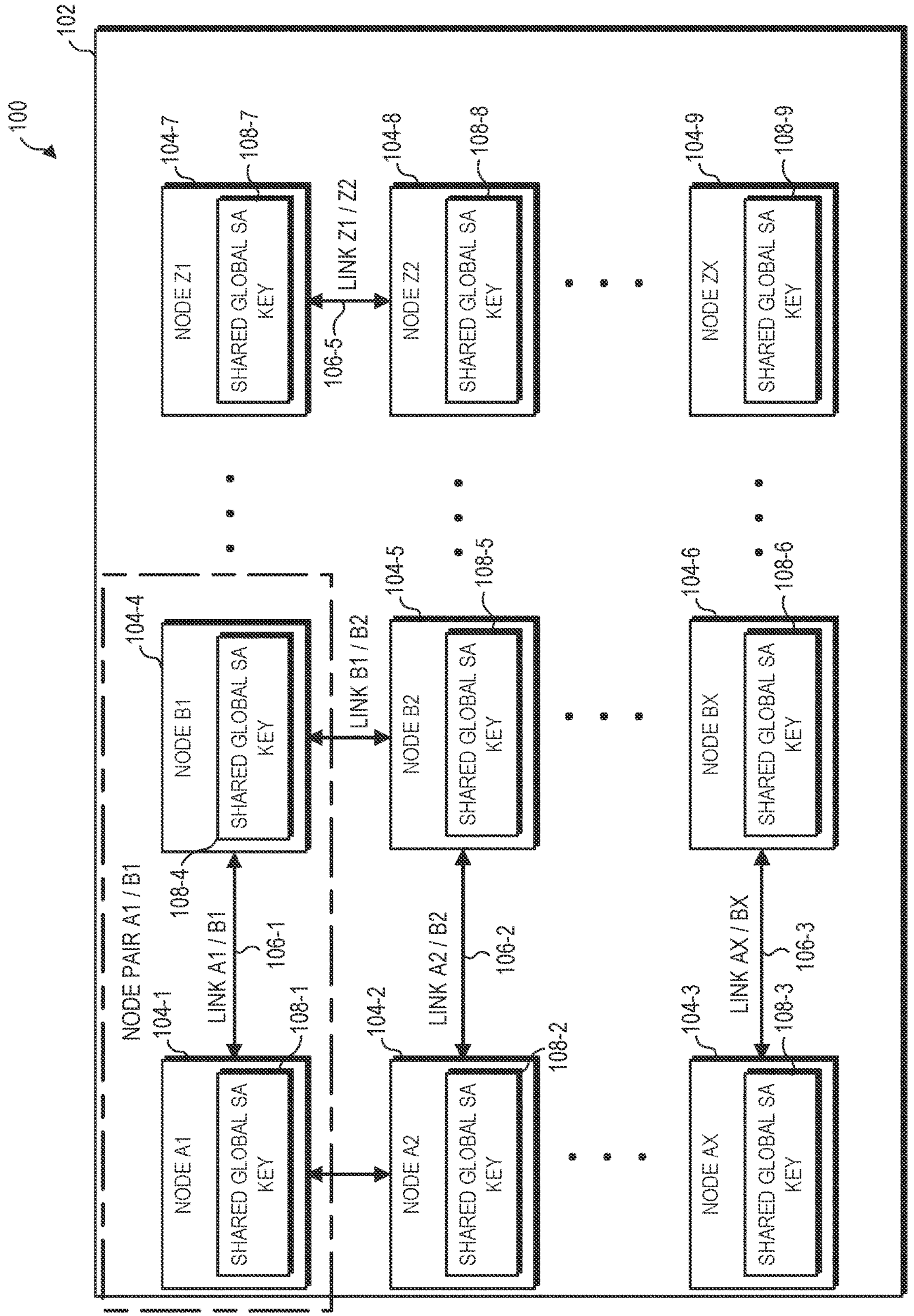
FIG. 1 is a block diagram of an example cluster computing environment implementing a global security association environment in which each node shares the same global security association key in accordance with some implementations.

Data centers typically use wired connections, such as Ethernet connections, to communicate between different nodes (also referred to herein as endpoints). These connections are made using high-speed network interface cards (NICs) and have the ability to provide security between the nodes using Transport Security Layer (TLS) encryption on the link. When TLS is established between two nodes, it is known as a security association (SA). This association includes the transmit and receive keys and sequence numbers for the communication packets. When an error is encountered, such as a TLS authentication error, the TLS session is terminated, and a new session is established.

Current data centers are being created with upwards of, for example, 32,000 or more nodes, and this node count is expected to keep increasing. With current security mechanisms implementing a different pair of keys per pair of nodes, the number of SAs becomes very large, and the amount of storage required to maintain these SAs in a node becomes very expensive. Although the SA information, including keys, is storable in an external memory, the time to access the SA information from the memory stalls the wired communication link. In some configurations, a cache of frequently used SAs is stored internally to the chip, but any SA not found in the cache may cause the link to stall for some time, which negatively impacts performance.

Due to the significantly increasing number of nodes, some security mechanisms attempt to reduce the number of keys required to communicate between nodes. For example, some security mechanisms allow all the nodes working as a single system (owned by the same guest owner) to share a single key as a global SA (GSA). However, with 32,000 nodes processing data at, for example, 800 Gigabits per second (Gbps), the counter values for Advanced Encryption Standard (AES) with Galois/Counter mode (GCM) encryption is typically exhausted every few hours. Additionally, the concerns with side- channel attacks and the quantity of data encrypted with a single key become problematic. Key rolling with shared keys between 32,000 nodes is generally not feasible due to the amount of coordinated effort required. For example, a large amount of storage for older keys is needed to allow for timing discrepancy and new key distribution delays between all 32,000 nodes. Also, with all nodes sharing the same key, a rogue node is able to create packets that are spoofed to come from any other node. Determining which node the data came from may be difficult or impossible. Therefore, revoking the key from a bad actor (e.g., a node that keeps the key and creates spoofed packets) may not be possible. Moreover, a feature of TLS is that any authentication error causes the node session to terminate. However, when multiple nodes use the same key, removing a single node (since they all use the same key) from the network also becomes very difficult or impossible.

Also, as described above, using a single key leads to increased side-channel attacks, such as differential power analysis and differential electromagnetic analysis (both herein referred to as DPA), against the key. DPA attacks use power monitoring (EM) techniques to discover and interpret the cryptographic keys used within a cryptographic algorithm. These attacks can be applied against both hardware and software versions of the algorithms. DPA attacks monitor the power usage and correlate the power used, the input/output values from the ciphering operation, and a guess at a sub-portion of the key (e.g., an 8-bit sub-portion for AES). Mathematical software attempts to determine this correlation using the power and input/output values. Although some algorithms are harder to perform DPA against, AES, the standard National Institute of Standards and Technology (NIST) algorithm, is generally subject to DPA attacks. AES can implement power masking but the quantity of blocks encrypted quickly overwhelms the ability to mask power without frequent key changes.

The effectiveness of DPA attacks depends on many factors, including the attackers' equipment, the ability to obtain power (EM) traces, and the amount of signal (power related to the key) versus noise in the system. The lower the signal level, compared to the noise, the more samples are required to boost the signal. Complex AES engines, even without countermeasures, such as pipelined AES or even multiple AES cores that are used to increase throughput, likely have less signal resulting in a need for more samples to decipher the encryption key. Due to the ability to perform DPA attacks, many industries (e.g., governmental industries, financial industries, smart card technologies, and the like) require protection against DPA attacks, such as countermeasures, reducing or masking the signal, rolling of keys, a combination thereof, and the like.

Conventional mechanisms for protecting against DPA attacks on AES engine implementations include masking operations that attempt to apply random masks to the input/output data used by the AES engine. This masking typically needs to be added before sub-blocks of the AES operation, and the mask generally needs to be removed after the sub-block. These masking operations increase the size of an AES design (hardware) through the addition of the masking gates and adding additional logic gates to the timing paths in the design. This requires the synthesis tools to use physically larger gates to make the same clock speeds as the non-masked design. As such, some AES cores which are resistant to side-channel attacks can be three to four times the size of a "non-protected" AES core. The effectiveness of countermeasures is not typically known until measurements are performed. Moreover, it can be difficult to know the effectiveness of countermeasures, such as masking gates, until such countermeasures can be tested and measured on actual hardware by an experienced testing team. Pre-tape-out power analysis helps but requires real-world data to tune the pre-tape-out power analysis in multiple iterations. Also, even though there are available AES masked cores that can mask large numbers of samples, keys still need to be updated multiple times per second to ensure security, which is not feasible in a global SA environment.

Another method of preventing DPA attacks against the encryption key is to change the key frequently enough that an attacker cannot obtain enough samples to break the encryption key. This operation is known as key rolling. The frequency of key rolling is either time-dependent or data-dependent. With a time-dependent key rolling schedule, the time should be selected based on the number of encryption operations that are able to be performed in the given time (this also could be a method to determine data dependence). The mechanism used to change the keys also presents a minimal amount of time required to update the key. Stated differently, the delays associated with the mechanism used to roll the keys present a floor to the rate that the key can be rolled. Key rolling is a strong countermeasure for applications where keys are not required for long periods of time (e.g., the key used for encryption generally only needs to be preserved until the data is decrypted). An example of these applications includes link-type encryption, including TLS for Ethernet security. In the case of link encryption, the data is encrypted by the sender and then transmitted to the receiver, which then decrypts the data. Once the data is decrypted, the key is able to be changed.

Accordingly, the present disclosure describes implementations of systems and methods for generating keys for a cluster of nodes in a global (single) security association environment while addressing at least the security concerns described above in a performant way with a minimized amount of storage per node pair. In at least some implementations, each node of a cluster of nodes implements a shared (i.e., the same) data encryption key (also referred to here as a global SA key). Each node is configured to use the shared global SA key as a key derivation key (KDK) such that each node has the same KDK. A pair of nodes uses the KDK with other information, such as the source node identifier (ID), the destination node ID, as shared secret, or the like, to generate/derive one or more data encryption keys that are specific to the pair of nodes. Stated differently, the nodes in a node pair are able to generate a unique key for data transmission and reception based on the shared data encryption key. As such, the techniques described herein allow nodes in a global SA configuration to save individual device storage space without suffering from the adverse security impacts of all nodes utilizing the same encryption key for data encryption operations. The described techniques further enable a node pair to automatically roll their keys, prevent DPA attacks, implement masking functions to prevent spoofing attacks even though all the nodes use the same KDK, and eliminate the need for dedicated software operations and synchronizing operations.

FIG. 1 illustrates an example of a computing environment 100 capable of implementing the security mechanisms described herein for generating unique data encryption keys for a cluster of nodes in a single security association. In the example shown in FIG. 1, the computing environment 100 includes a cluster 102 of computing nodes 104 (illustrated as node 104-1 to 104-9). Each node 104 in the cluster 102 is able to establish a communication link 106 (illustrated as communication links 106-1 to 106-5) with one or more other nodes 104 in the cluster 102 (also referred to herein as node cluster 102). The communication link 106 established between a node pair is secured using one or more security mechanisms that encrypt the data in both directions between the nodes 104 of the node pair. For example, Internet Protocol security (IPsec) protocols can be implemented to protect data packets communication between two nodes 104, such as Node A1 104-1 and Node B1 104-4. However, before data can be securely transferred between the nodes 104 using the IPsec framework, security associations (SAs) typically need to be established between the nodes 104.

An SA, in at least some embodiments, defines security parameters such as a mutually agreed upon key, one or more security protocols, and a security parameter index (SPI). In at least some configurations, an SA defines the security parameters for a one-way connection. In these configurations, a separate SA is typically configured for each direction, i.e., for sending data and receiving data. However, in a cluster computing environment implementing a conventional IPsec SA configuration, the number of SAs maintained by a single node is very large and the amount of storage required to maintain these SAs is very expensive. As such, the computing environment 100 of FIG. 1 implements a global SA (GSA) configuration in which each of the nodes 104 shares a single key as a global SA (GSA). For example, FIG. 1 shows that each of the nodes 104 in the cluster 102 shares the same data encryption key 108 (illustrated as GSA key 108-1 to 108-9) in a GSA configuration. In at least some implementations, a single data encryption key is used for encryption and decryption, one key is used for encryption and another key is used for decryption, or multiple keys are used for encryption and decryption. The GSA key 108, in at least some implementations, is a cryptographic key generated by a server (or other entity) and distributed to each of the nodes 104 in the cluster 102. However, other mechanisms for generating and distributing the GSA key 108 are applicable as well.

Implementing a shared GSA key 108 across all the nodes 104 in the cluster 102 reduces the number of SAs stored at a node 104 thereby saving storage space. However, as described above, implementing a single shared GSA key 108 across all the nodes 104 presents multiple security concerns regarding, for example, removal of a node from the GSA, error handling, key rolling, and quantity of data encrypted with a single key. As such, in at least some implementations, the nodes 104 in the cluster 102 are configured to use the shared GSA key 108 as a key derivation key (KDK) such that the nodes 104 are able to derive specific data encryption keys between pairs of nodes 104. In addition, as described below, each node 104 implements fast key derivation functions and uses additional input such that a pair of nodes has an individual encryption key (per direction) and are able to roll the KDKs individually to prevent side-channel analysis attacks. Therefore, the techniques described herein address the security concerns associated with using a shared GSA key in a node cluster while still allowing for a reduction in the number of SAs stored by a node and the total amount of storage required for providing a single security association per pair of nodes. The techniques described herein further provide a method of quickly rolling keys to prevent DPA attacks and eliminate or at least reduce dedicated software operations, which are slow, and synchronizing operations, which negatively affect bandwidth and latency.

Figure 2:
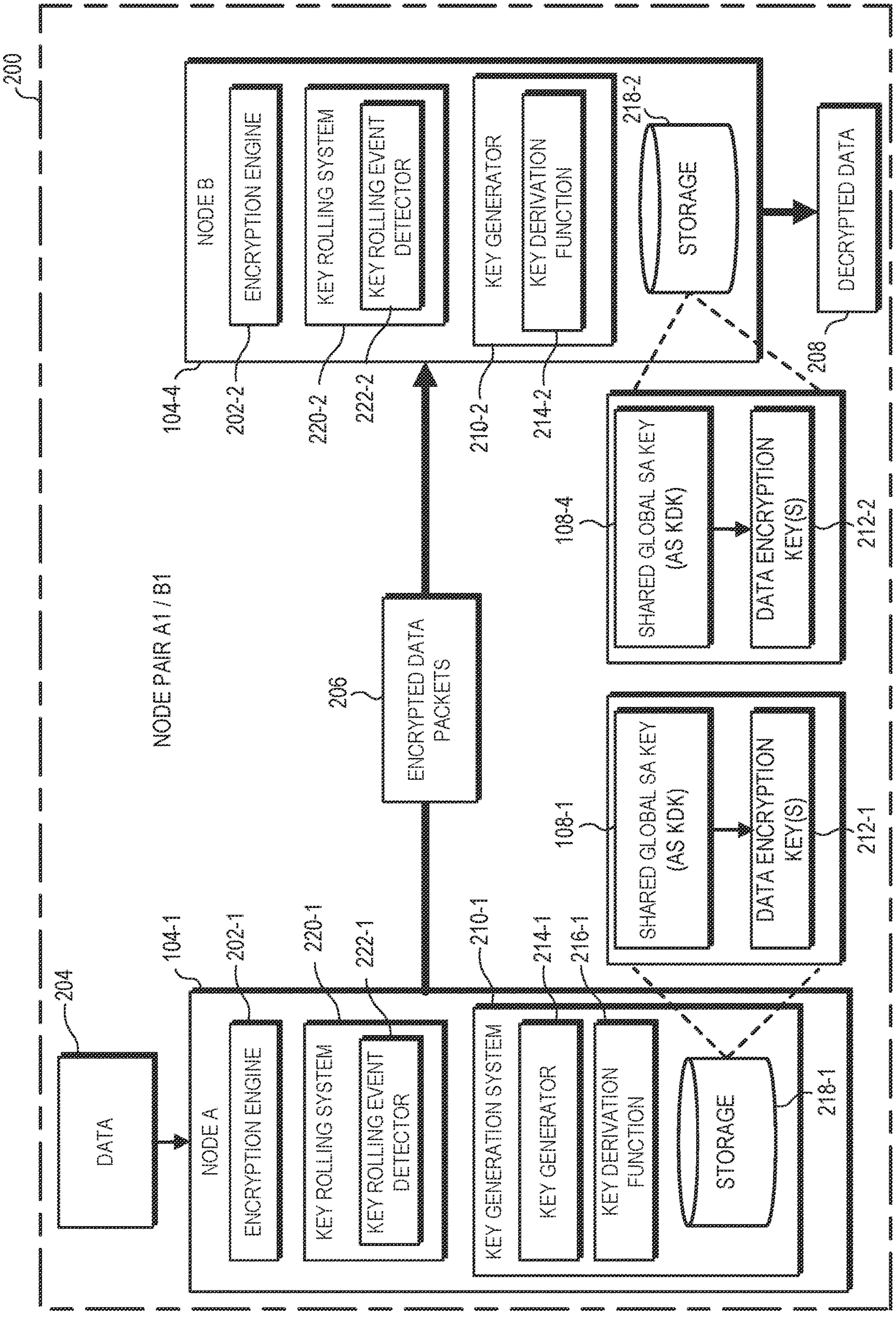
FIG. 2 is a block diagram of an example node pair in the cluster computing environment of FIG. 1 in accordance with some implementations.

FIG. 2 illustrates one example of a node pair 200 from the cluster 102 of FIG. 1. In this example, each node 104 of the node pair 200 implements the techniques described herein for generating individual keys in a global (single) security association. It should be understood that although FIG. 2 only shows one node pair 200, the following description is applicable to any number of node pairs in the cluster 102. In the example shown in FIG. 2, the node pair 200 includes a first node 104-1 and a second node 104-4. A communication link 106-1 is established between these nodes 104. The first node 104-1 and the second node 104-4 correspond to devices configured to interface with each other, e.g., using the communication link 106-1. Examples of these devices include entire computing systems or components of a computing system, such as processors (e.g., graphics processing units and central processing units), disk array controllers, hard disk drive host adapters, memory cards, solid-state drives, wireless communications hardware connections, Ethernet hardware connections, switches, bridges, network interface controllers, and the like.

The first node 104-1 and the second node 104-4 communicate over the communication link 106-1. In at least some implementations, the communication link 106-1 is bi-directional, such that the first node 104-1 transmits data over the communication link 106-1 that is received by the second node 104-4, and the second node 104-4 transmits data over the communication link 106 that is received by the first node 104-1. Alternatively, the communication link 106 facilitates data transmission in a single direction, e.g., transmissions of data by the first node 104-1 over the communication link 106 for receipt by the second node 104-4 or transmissions of data by the second node 104-4 over the communication link 106 for receipt by the first node 104-1. In some variations where the communication link 106 facilitates data transmission in a single direction, the node pair 200 further includes one or more additional communication links (not shown) between the first node 104-1 and the second node 104-4. In at least one scenario where the communication link 106 facilitates transmission of data from the first node 104-1 for receipt by the second node 104-4, for instance, an additional communication link facilitates transmission of data from the second node 104-4 for receipt by the first node 104-1. Alternatively or in addition, the communication link 106-1 facilitates data transmission in a single direction for a subset (e.g., only one) of a plurality of different types of data packets, e.g., transmissions of a first type of data by the first node 104-1 over the communication link 106 for receipt by the second node 104-4, transmissions of a second type of data by the first node 104-1 over the communication link 106 for receipt by the second node 104-4, transmissions of a third type of data by the first node 104-1 over the communication link 106 for receipt by the second node 104-4, and so forth.

In at least some implementations, the first node 104-1 and the second node 104-4 include an encryption engine 202 (illustrated as encryption engine 202-1 and encryption engine 202-2). In general, the encryption engine 202 encrypts and decrypts data for communication over the communication link 106-1 using one or more keys. The encryption engine 202, in at least some embodiments, also authenticates encrypted data and checks authentication of decrypted data. In at least some implementations, the encryption engine 202 is configured according to, or otherwise includes one or more components that utilize, the advanced encryption standard (AES) for encryption and decryption operations.

In a configuration where the first node 104-1 corresponds to the transmitting device and the second node 104-4 corresponds to the receiving device, the first node 104-1 receives data 204 for communication to the second node 104-4. The encryption engine 202-1 at the first node 104-1 encrypts and authenticates the data 204. The first node 104-1 (e.g., a transmitter of the first node 104-1) transmits encrypted data packets 206, which are formed based on the encrypted and authenticated data 204 output by the encryption engine 202-1. The second node 104-4 receives the encrypted data packets 206. The encryption engine 202-2 at the second node 104-4 decrypts the encrypted data packets 206 and checks the authentication to form decrypted data 208.

In scenarios where the second node 104-4 corresponds to the transmitting device and the first node 104-1 corresponds to the receiving device, the data flows in the opposite direction as the scenario described above, e.g., the second node 104-4 receives the data 204, the encryption engine 202-2 at the second node 104-4 encrypts and authenticates the data 204, the second node 104-4 transmits the encrypted data packets 206 over the communication link 106-1 to the first node 104-1, and the encryption engine 202-1 at the first node 104-1 decrypts the encrypted data packets 206 and checks the authentication to output the decrypted data 208.

As noted above, the encryption engine 202 encrypts and decrypts the data using one or more data encryption keys. The encryption engine 202-1 at the first node 104-1 and the encryption engine 202-2 at the second node 104-4 encrypt and decrypt data communicated over the communication link 106-1 using matching data encryption keys, e.g., the key used by the encryption engine 202-1 at the first node 104-1 to encrypt the data 204 and form the encrypted data packets 206 for communication over the communication link 106-1 is the same as the key used by the encryption engine 202-2 at the second node 104-4 to decrypt the encrypted data packets 206. However, as described above, the key (e.g., the GSA key 108) shared by the first node 104-1 and the second node 104-4 is also shared by the remaining nodes 104 in the cluster 102, which creates potential security issues relating to the removal of a node from the GSA, error handling, key rolling, and quantity of data encrypted with a single key.

As such, in at least some embodiments, the first node 104-1 and the second node 104-4 (as well as the remaining nodes 104 in the cluster 102) implement a key generation system 210 that generates one or more data encryption keys 212 (also referred to herein as keys 212) using the shared GSA key 108 as a KDK. By using the shared GSA key 108 as a KDK, the key generation system 210 is able to generate/derive one or more data encryption keys 212 that are specific to the node pair 200. Stated differently, the first node 104-1 and the second node 104-4 are able to generate a unique key 212 for data transmission and reception based on the shared GSA key 108. In at least some implementations, the data encryption keys 212 are cryptographic keys, such as binary strings used as a secret parameter by a cryptographic algorithm, e.g., the encryption engine 202 or a component of the engine. Examples of cryptographic keys include a random binary string of a length specified by the cryptographic algorithm and a pseudo-random binary string of the specified length. In at least some implementations, the encryption engine 202 uses the data encryption keys 212 as well as additional data to encrypt the data 204. Examples of additional data used for encryption include initialization vectors and/or initial count values.

The first node 104-1 and second node 104-4, in at least some implementations, also implement a key rolling system 220 (illustrated as key rolling system 220-1 and key rolling system 220-2) that is separate from or part of the key generation system 210. Also, in at least some implementations, the key rolling system 220 includes the key generator 214 or is at least in communication with the key generator 214. The key rolling system 220, in at least some implementations, includes a key rolling event detector 222 (illustrated as key rolling event detector 222-1 and key rolling event detector 222-2). The key rolling system 220 is described in greater detail below.

In at least some implementations, the key generation system 210 includes a key generator 214, a key derivation function 216, and storage 218. The storage 218, in at least some embodiments, acts as a cache to store, for example, the last N keys generated by the key generator 214 based on the output of the key derivation function 216. In at least some implementations, the storage 218 also includes the shared GSA key 108. Although the key generation system 210 is depicted separately from the encryption engine 202 in FIG. 2, in at least some implementations, the key generation system 210 or one or more components of the key generation system 210 are included as part of the encryption engine 202. Additionally or alternatively, the key generation system 210 includes more, fewer, or different components than those illustrated in FIG. 2.

In at least some implementations, the key generator 214 generates the data encryption keys 212 using the key derivation function 216, which is a function that takes input including a key (e.g., a KDK) and other data to generate/derive keying material that can be employed by cryptographic algorithms, such as those implemented by the encryption engine 202. As described in greater detail below, the key derivation function 216, in at least some implementations, uses the shared GSA key 108 as the KDK to generate the data encryption keys 212. In at least some embodiments, the key derivation function 216 deterministically generates the data encryption keys 212. As such, given the same input, the key derivation function 216-1 at the first node 104-1 and the key derivation function 216-2 at the second node 104-4 generate matching data encryption keys 212. To this end, a first data encryption key 212-1 generated by the key derivation function 216-1 at the first node 104-1 matches a first data encryption key 212-2 generated by the key derivation function 216-2 at the second node 104-4, e.g., when the functions initially receive the same input (e.g., the shared GSA key 108 and additional input data 304 described below with respect to FIG. 3).

The key derivation function 216, in at least some implementations, is configured such that the first node 104-1 and the second node 104-4 are able to generate keys 212 on demand. Also, the input to the key derivation function 216 is configured or selected such that the node pair 200 is able to use a unique key for data transmission and reception. Also, this input provides for automatic key rolling, and, with an additional masking function, provides for the ability to ensure that one node is not able to spoof packets to another node even though they use the same KDK.

Figure 3:
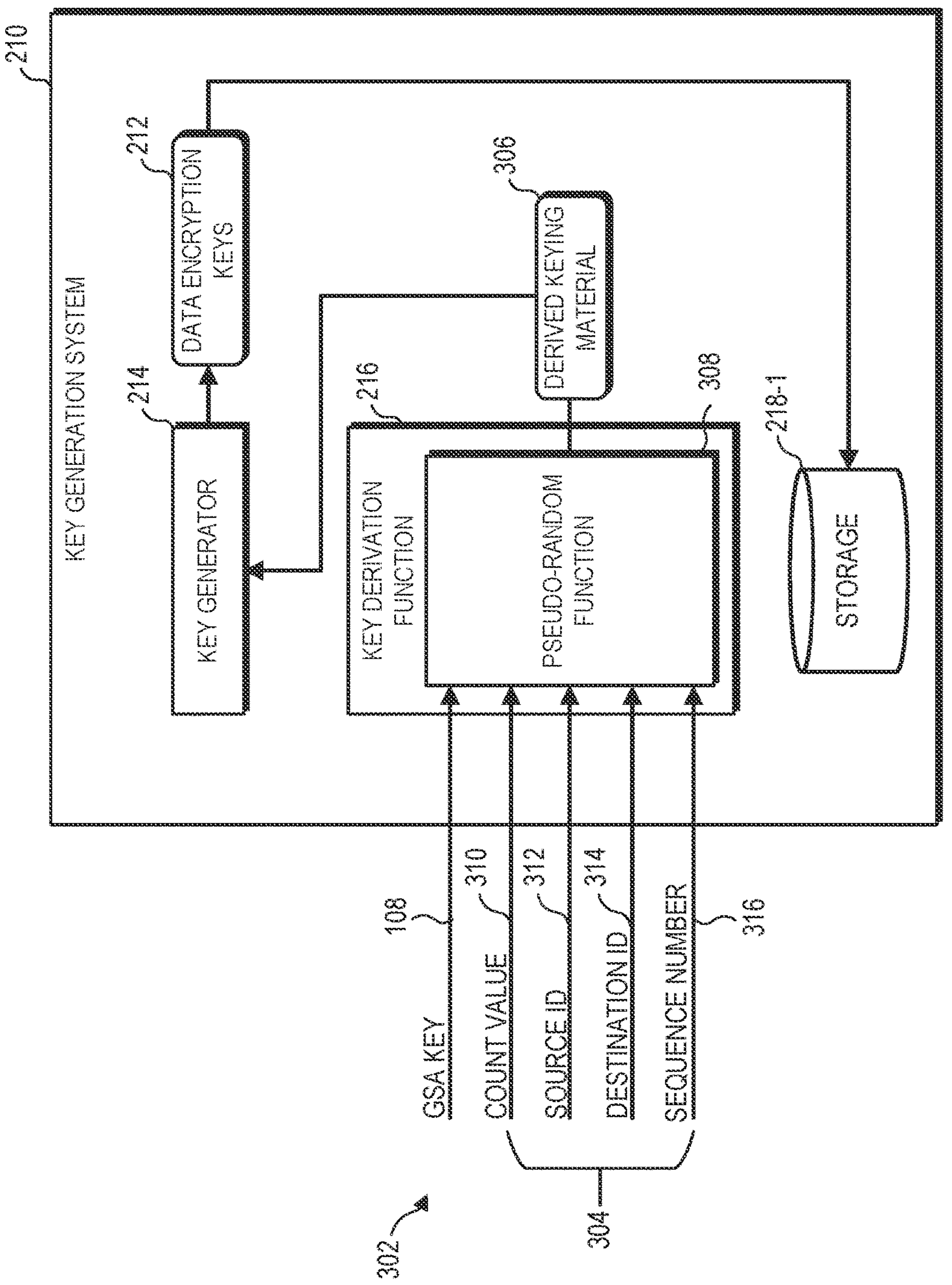
FIG. 3 illustrates an example of the key generation system of a node in the node pair of FIG. 2 in accordance with some implementations.

FIG. 3 shows one example configuration of the key generation system 210 for generating data encryption key(s) 212 based on the shared GSA key 108 and an additional set of input using the key derivation function 216. As described in greater detail below, the key derivation function 216 takes as input 302 the shared GSA key 108 and additional data 304 (also referred to herein as additional input data 304) and generates or derives keying material 306. The keying material 306 is segmentable into one or more keys. For example, the key generator 214 converts the keying material 306 output by the key derivation function 216 into one or more cryptographic keys, e.g., one or more data encryption keys 212. Alternatively or additionally, the keying material 306 also includes other parameters, such as an initialization vector, a key-derivation-key nonce, and the like. In at least some implementations, the initialization vector is used as a counter to track a number of the encrypted data packets 206 communicated, or to track the number of data packets encrypted.

In at least some implementations, the key generation system 210 is configured to implement one or more of a variety of key generation algorithms for generating the data encryption key(s) 212 based on the shared GSA key 108 and additional input data 304. For example, in at least some implementations, the key derivation function 216 implements a pseudo-random function (PRF) 308, such as AES cipher-based message authentication code (CMAC), as defined in the National Institute of Standards and Technology (NIST) special publication (SP) 800-38B and SP 800-108. Other applicable pseudo-random functions include keyed-hash message authentication code (HMAC), Keccak-based message authentication code (KMAC), and the like.

The pseudo-random function 308, in at least some implementations, takes as input the shared GSA key 108 acting as the KDK and additional input data 304. In configurations implementing AES CMAC as the pseudo-random function 308, the shared GSA key 108 is used as the block cipher key and the additional input data 304 is used as the message M for the CMAC operations performed by the pseudo-random function 308, as defined in NIST SP 800-38B. In at least some implementations, the additional input data 304 includes a count value 310, a source identifier (ID) 312, a destination ID 314, and a sequence number 316. However, other input is applicable as well. The count value 310 is used as an input to each invocation of the pseudo-random function 308. For example, the count value 310 is an integer representing the current iteration of the pseudo-random function 308 and is incremented for each subsequent iteration. The source ID 312 is a unique identifier of the node 104 of the node pair 200 acting as the transmitter of data packets, and the destination ID 314 is a unique identifier of the node 104 of the node pair 200 acting as the receiver. In at least some implementations, the nodes 104 of the node pair 200 exchange IDs when the communication link 106 is established. The sequence number 316 represents a count value of the number of packets sent from the source node to the destination node in the node pair 200.

As indicated above, the pseudo-random function 308, in at least some implementations, is an AES-based pseudo-random function, such as an AES CMAC pseudo-random function. Since AES implements a 128-bit block size, the input to the pseudo-random function 308 is a 128-bit input and the corresponding output (e.g., the keying material 306) is a 128-bit output. For example, the count value 310 is 2-bit value, the source ID 312 is 32-bit value, the destination ID 314 is a 32-bit value, and the sequence number 316 is a 62-bit value. However, other lengths are applicable as well. The sequence number 316, in at least some implementations, is filled with the upper bits of the transmit sequence number of the data packet to be transmitted by the source node 104 of the node pair 200. In at least some implementations, if the key generation system 210 is configured to perform key rolling at, for example, every 128 packets, then the lower 7 bits are not used in this field. In other implementations, if the key generation system 210 is configured to perform key rolling for every packet, the full sequence number is used in this field. However, other configurations are applicable as well.

In at least some implementations, one or more mechanisms are implemented to prevent DPA and other attacks against the pseudo-random function 308. For example, one or more masking functions are applied to the input 302 (e.g., the count value 310, the source ID 312, the destination ID 314, and the sequence number 316). One example of a masking function includes taking the 128-bit value of the input 302 and performing a modular Galois Field multiplication with a 64-bit value that is shared between the first node 104-1 and the second node 104-4 of the node pair 200. The shared value, in at least implementations, is agreed upon or communicated by the nodes 104 in the node pair 200 when the communication link 106-1 is established. Since each pair of nodes in the node cluster 102 has a unique 64-bit value, one node is not able to generate keys destined for a different node.

The key generation system 210, in at least some implementations, is configured to generate data encryption keys 212 that are greater than 128 bits (e.g., 256-bit keys, 384-bit keys, 512-bit keys, and the like). However, in implementations implementing an AES-based pseudo-random function, the pseudo-random function 308 generates 128 bits of keying material 306 per iteration, as described above. As such, in at least some implementations, the key derivation function 216 invokes the pseudo-random function 308 multiple times based on a counter mode. However, other modes, such as a feedback mode, a double-pipeline iteration mode, or the like, are applicable as well.

Figure 4:
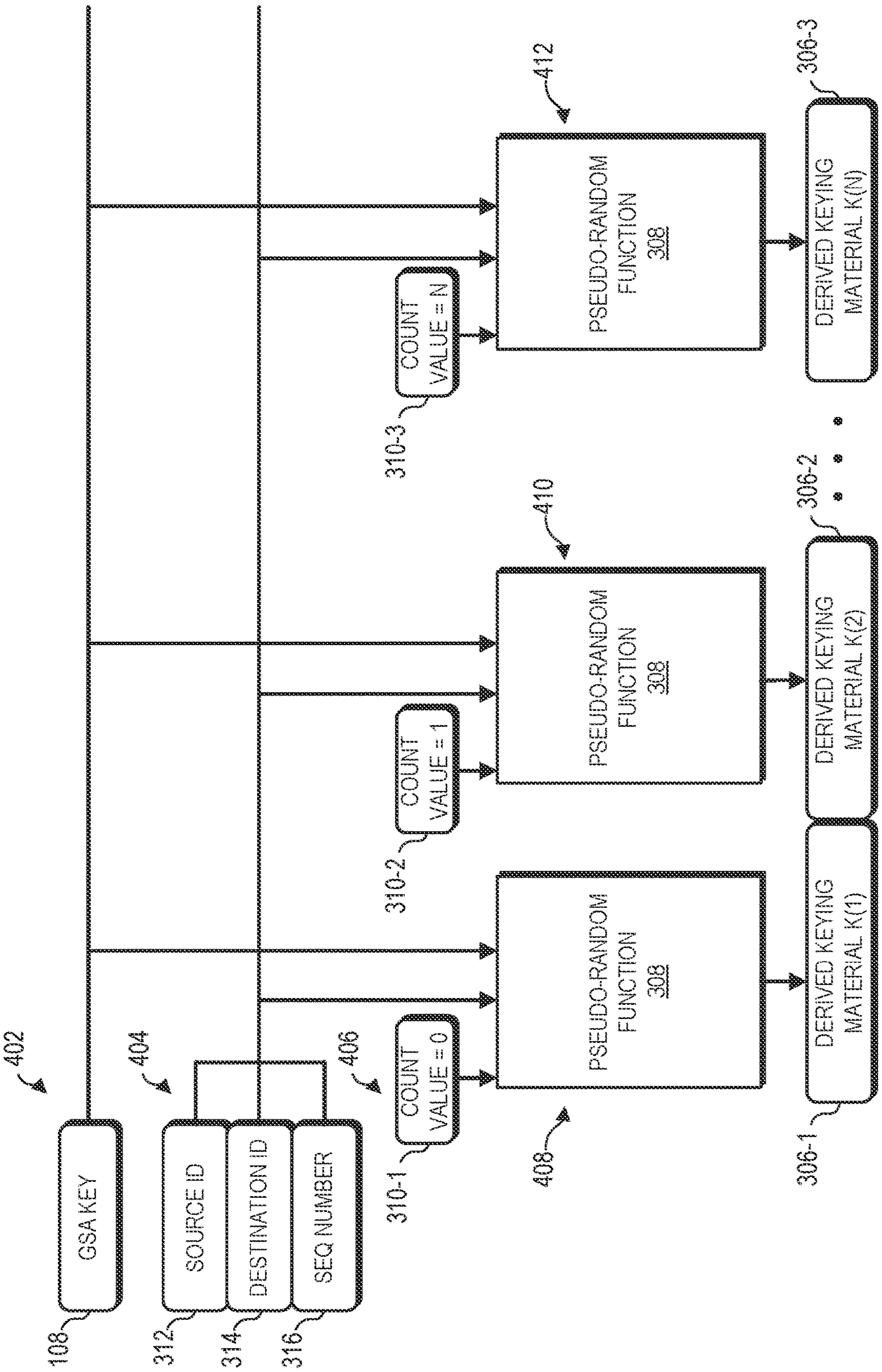
FIG. 4 illustrates the key generation system of FIG. 3 performing multiple iterations of a pseudo-random function for generating data encryption keys unique to the node pair of FIG. 2 in accordance with some implementations.

FIG. 4 shows one example, of the key derivation function 216 invoking an AES CMAC pseudo-random function 308 multiple times in a counter mode. In this example, each iteration of the pseudo-random function 308 takes as input a KDK 402, iteration-dependent input data 404, and fixed input data 406. In at least some implementations, the KDK 402 comprises the shared GSA key 108, the iteration-dependent input data 404 comprises the counter value 310 (illustrated as counter value 310-1 to counter value 310-3), and the fixed input data 406 comprises the source ID 312, the destination ID 314, and the sequence number 316. As the fixed input data 406 remains the same for each iteration, the iteration-dependent input data 404 is used in combination with the fixed input data 406 to generate a different set of keying material 306 (illustrated as keying material 306-1 to keying material 306-3) for each iteration.

As shown in the example of FIG. 4, a first iteration 408 of the pseudo-random function 308 takes as input the GSA key 108, the counter value 310-1, the source ID 312, the destination ID 314, and the sequence number 316. In this iteration, the counter value 310-1 is set equal to, for example, 0. The pseudo-random function 308 performs AES CMAC operations on the input (e.g., PRF (count =0, fixed-_data_input)) and generates or derives a first set of keying material 306-1 of a specified length, such as 128 bits (e.g., [127:0]. In at least some embodiments, the AES CMAC operations are performed in a pipelined manner. In this example, the key generation system 210 is configured to generate data encryption keys 212 that are greater than 128 bits. As such, at least a second iteration 410 of the pseudo-random function 308 is performed. In this iteration, the pseudo-random function 308 also takes as input the GSA key 108, the counter value 310-2, the source ID 312, the destination ID 314, and the sequence number 316. However, the counter value 310-2 has been incremented and is set equal to, for example, 1. Therefore, the counter value 310-2 in the second iteration 410 has a different counter value than the counter value 310-1 in the first iteration 408 resulting in a second set of keying material 306-2 (e.g., [255:128] =PRF (count =1, fixed_data_input)) being generated that is different than the first set of keying material 306-1. If additional keying material 306 is needed, one or more additional iterations 412 of the pseudo- random function 308 are performed. Each subsequent iteration takes the same KDK 402 and fixed input data 406 as the previous iterations but takes a different incremented counter value 310 to generate a different set of keying material 306-3 (e.g., [383:256] =PRF (count =2, fixed_data_input)) as described above with respect to the second iteration 410.

After all the iterations of the pseudo-random function 308 have been performed, the keying material 306 is provided to the key generator 214, which converts at least a portion of the keying material 306 into one or more cryptographic keys, e.g., one or more data encryption keys 212. In at least some implementations, the generated data encryption keys 212 are maintained in the storage 218 of the nodes 104. As described above, the data encryption keys 212 are used by the encryption engine 202 of the transmitting node of the node pair 200 to encrypt data packets and are used by the encryption engine 202 of the receiving node of the node pair 200 to decrypt the encrypted data packets. In at least some implementations, data encryption keys 212 recently used between the nodes 104 of a node pair 200 are maintained in a cache (e.g., storage 218) for subsequent use by the nodes 104. The key generator 214 can also generate other parameters from the keying material 306, such as an initialization vector, a key-derivation-key nonce, and the like. As such, although the nodes 104-1 and 104-4 of the node pair 200 share the same GSA key 108 with all the remaining nodes 104 in the cluster 102, the nodes are able to generate/derive one or more data encryption keys 212 that are specific to the node pair 200.

In some instances, side-channel attacks can be performed by malicious entities in an attempt to circumvent or obtain the data encryption keys implemented by the nodes in a node cluster. One mechanism to mitigate or prevent side-channel attacks is key rolling, which refers to the act of replacing a key that is in use (e.g., for performing encrypting and decrypting operations) with a different key. As described above, key rolling in node clusters configured with a global SA is generally not feasible due to the number of nodes sharing the same key. However, because the techniques described herein implement the shared GSA key 108 as the KDK for the key derivation function 216, each node pair generates data encryption keys 212 that are specific to the node pair 200, which allows key rolling to be efficiently performed for the data encryption keys 212.

To that end, the key rolling systems 220 of the node 104 in the node pair 200 perform one or more automatic key rolling operations in order to improve security of data handled by the first node 104-1 and the second node 104-4 and communicated across the communication link 106-1. The key rolling system 220 communicates with the key generator 214 such that the key generator 214 automatically rolls to a next key 212 responsive to a key rolling event known by the key rolling system 220 at both the first node 104-1 and the second node 104-4. By "known," it is meant that the event is mutually prearranged (e.g., programmatically set), such that responsive to occurrence of the event, the key rolling system 220-1 at the first node 104-1 and the key rolling system 220-2 at the second node 104-4 both detect the event and automatically replace a first data encryption key 212 (e.g., an in-use key) with a second data encryption key 212 (e.g., a not-yet-used key).

For example, the key rolling event detector 222 of the key rolling system 220 detects key rolling events to initiate the key rolling. It is to be appreciated that the key rolling event detector 222 detects different events to initiate key rolling in various implementations. In at least some implementations, the mutually prearranged event corresponds to a usage event, such as a specified number of the encrypted data packets 206 communicated over the communication link 106. For example, the key rolling event detector 222 detects when a number of encrypted data packets 206 communicated satisfies a specified threshold number of packets (e.g., 1 packet, 128 packets, or the like) and initiates key rolling. In such scenarios, both the key rolling event detector 222-1 at the first node 104-1 and the key rolling event detector 222-2 at the second node 104-4 are programmatically configured to detect when the number of data packets communicated satisfies the specified threshold number of packets and to initiate key rolling in response. Where the first node 104-1 is the transmitting device and the second node 104-4 is the receiving device, for instance, a counter of packets at the first node 104-1 is incremented at the encryption of a data packet and a counter of packets at the second node 104-4 is incremented at decryption of data packet. Further, the key rolling event detector 222-1 at the first node 104-1 detects when the number of packets transmitted, as indicated by the counter of packets at the first node 104-1, satisfies the specified threshold, and the key rolling event detector 222-2 at the second node 104-4 detects when the number of packets received, as indicated by the counter of packets at the second node 104-4, satisfies the specified threshold. Additionally or alternatively, examples of key rolling events that are detectable by the key rolling event detector 222 include, but are not limited to, a number (e.g., 128) of flow control units (FLITs) of the encrypted data communicated, a number of sectors, a number of message authentication code (MAC) tags, a MAC aggregation boundary, a value of a bit of the encrypted data (e.g., a key change or key rolling bit), an interface-particular event (e.g., a PCIe-specific event), or the number of blocks encrypted with the data encryption key (e.g., if data packets are not all uniform in size).

In at least some implementations, when the key rolling event detector 222-1 at the first node 104-1 and the key rolling event detector 222-2 at the second node detect a key rolling event, the data encryption key 212 currently in use by the encryption engine 202 is replaced with a different data encryption key 212. In at least some implementations, the encryption engine 202 does not reuse data encryption keys 212. Instead, the encryption engine 202 obtains a new data encryption key 212 from the storage 218, e.g., as generated by the key generator 214. For example, when a key rolling event is detected, the key rolling system 220 of each node 104 in the node pair 200 communicates with the key generator 214 to generate a new data encryption key 212 by, for example, performing the key generation operations described above with respect to FIG. 2 to FIG. 4. The generated data encryption key 212 can then be maintained in the storage 218. Subsequent to the replacement, the encryption engine 202-1 at the first node 104-1 uses the new data encryption key 212 to encrypt data for communication over the communication link 106-1, and the encryption engine 202-2 at the second node 104-4 uses the new data encryption key 212 to decrypt the data received via the communication link 106-1 and output the decrypted data 208.

Figure 5:
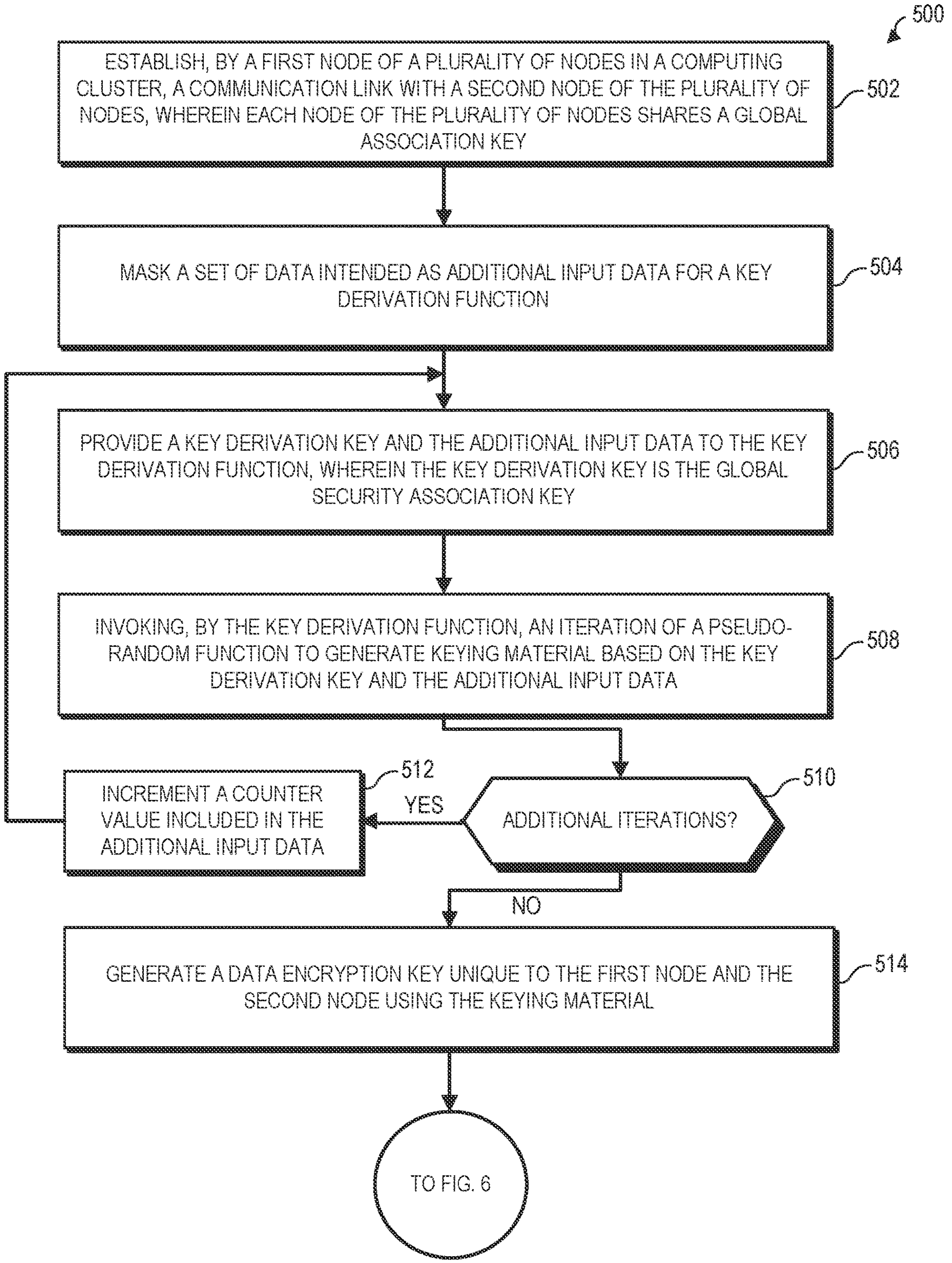
FIG. 5 and FIG. 6 are diagrams together illustrating an example method for generating data encryption keys unique to the node pair of FIG. 2 based on the shared global security association key and additional input data in accordance with some embodiments.
Figure 6:
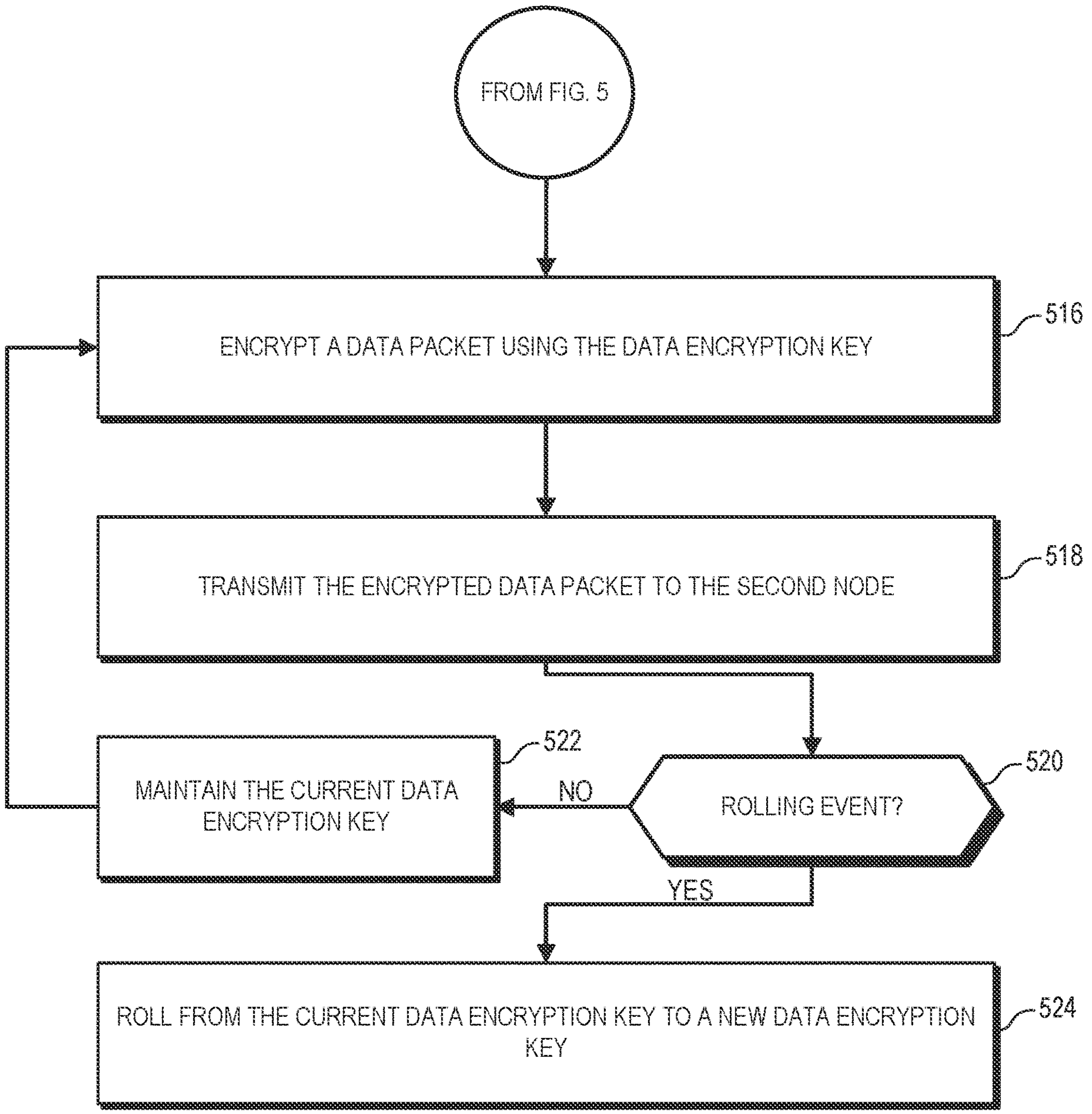

FIG. 5 and FIG. 6 together illustrate a flow diagram of a method 500 for generating unique data encryption keys 212 for a node pair in a cluster of nodes sharing a global security association key 108. It should be understood the processes described below with respect to method 500 have been described above in greater detail with reference to FIG. 1 to FIG. 4. For purposes of description, the method 500 is described with respect to a first node 104-1 of a node pair 200. However, the second node 104-4 of the node pair 200 performs a similar process. Also, the method 500 is not limited to the sequence of operations shown in FIG. 5 and FIG. 6, as at least some of the operations can be performed in parallel or in a different sequence. Moreover, in at least some implementations, the method 500 can include one or more different operations than those shown in FIG. 5 and FIG. 6.

At block 502, a first node 104-1 of a plurality of nodes 104 in a computing cluster 102 establishes a communication link 106-1 with a second node 104-4 of nodes 104. Each node 104 of the cluster 102 of nodes shares a GSA key 108. At block 504, a key generation system 210-1 of the first node 104-1 applies a masking function to a set of data (e.g., a counter value 310, a source ID 312, a destination ID 314, and a transmit sequence number 316) to be used as additional input data 304 for a key derivation function 216-1. However, in other implementations, the masking function is not applied to the set of data. At block 506, the key generation system 210-1 provides a key derivation key, such as the GSA key 108, and the additional input data 304 (in a masked or unmasked form) as input to the key derivation function 216-1. At block 508, the key derivation function 216-1 invokes a pseudo-random function 308, such as an AES CMAC pseudo-random function, to generate keying material 306 based on the GSA key 108 and the additional input data 304.

At block 510, the key generation system 210-1 determines if an additional iteration of the pseudo-random function 308 is to be performed to generate additional key material 306. At block 512, if additional keying material 306 is to be generated, a counter value 310 included in the additional input data 304 is incremented and the process returns to block 506 where the GSA key 108 and the additional input data 304 (including the incremented counter value 310) are provided as input to the key derivation function 216-1. At block 508, the pseudo-random function 308 generates a new keying material 306 that is different than the previously generated keying material 306.

At block 514, if a requisite number of iterations of the pseudo-random function 308 has been performed, a key generator 214-1 of the key generation system 210-1 generates a data encryption key 212-1 unique to the first node 104-1 and the second node 104-4 using the generated/derived keying material 306. At block 516, an encryption engine 202-1 encrypts a data packet 206 using the data encryption key 212-1. At block 518, the first node 104-1 transmits the encrypted data packet 206 to the second node 104-4. The second node 104-4 decrypts the data packet 206 with a matching data encryption key 212-2 generated by a key generation system 210-2 using a process similar to that described above with respect to block 504 to block 514.

At block 520, a key rolling event detector 222 at both the first node 104-1 and the second node 104-4 determines if a key rolling event, such as a specified number of transmitted packets, has been detected. At block 522, if a key rolling event has not been detected, the first node 104-1 and the second node 104-4 maintain the current data encryption key 212 and the process returns to, for example, block 516. At block 524, if a rolling event has been detected, the key generation system 210 rolls from the current data encryption key 212 to a new data encryption key. For example, the process flows to block 504 to initiate the process for generating a new data encryption key. The process then flows to block 506 and the operations described above with respect to block 506 to block 514 are repeated to generate a new data encryption key based on the shared GSA key 108 and the additional input data 304 including the incremented counter value 310.

Figure 7:
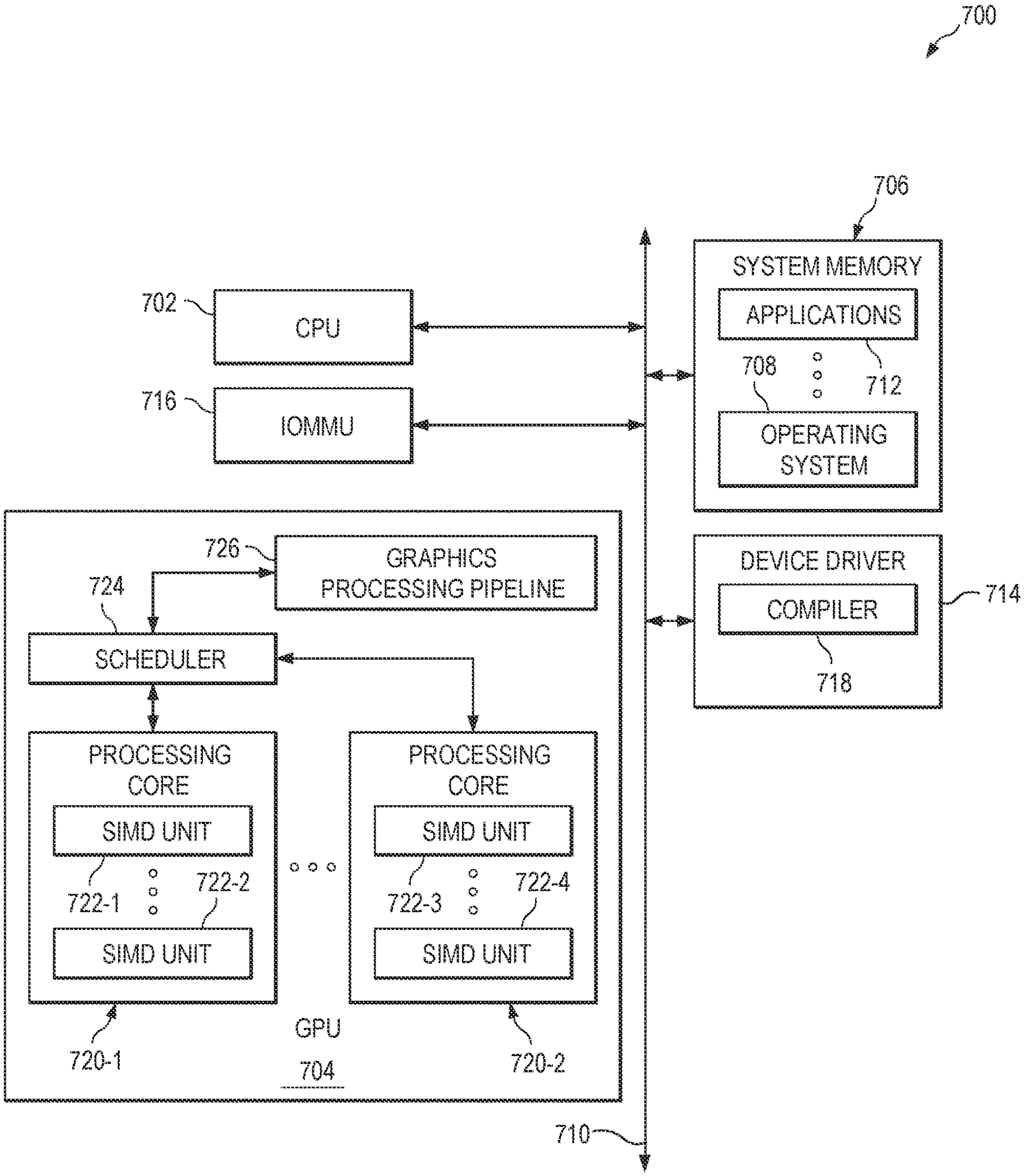
FIG. 7 is a block diagram of a processing device in accordance with some implementations.

FIG. 7 is a block diagram illustrating an example of a processing device 700, such as a node 104 in the cluster 102 of FIG. 1 or a processing device capable of including a node 104 in the cluster 102. It is noted that the number of components of the processing device 700 varies from implementation to implementation. In at least some implementations, there is more or fewer of each component/subcomponent than the number shown in FIG. 7. It is also noted that the processing device 700, in at least some implementations, includes other components not shown in FIG. 7. Additionally, in other implementations, the processing device 700 is structured in other ways than shown in FIG. 7. Also, components of the processing device 700 are implemented as hardware, circuitry, firmware, software, or any combination thereof. In some implementations, the processing device 700 includes one or more software, hardware, circuitry, and firmware components in addition to or different from those shown in FIG. 7.

In at least some implementations, the processing device 700 includes one or more central processing units (CPU) 702 and one or more accelerated processing units (APUs), such as a graphics processing unit (GPU) 704. Other examples of an APU include any of a variety of parallel processors, vector processors, coprocessors, general-purpose GPUs (GPGPUs), non-scalar processors, highly parallel processors, artificial intelligence (AI) processors, inference engines, machine learning processors, other multithreaded processing units, scalar processors, serial processors, or any combination thereof. The CPU 702, in at least some implementations, includes one or more single-core or multi-core CPUs. In various implementations, the GPU 704 includes any cooperating collection of hardware and or software that perform functions and computations associated with accelerating graphics processing tasks, data-parallel tasks, nested data-parallel tasks in an accelerated manner with respect to resources such as conventional CPUs, conventional graphics processing units (GPUs), and combinations thereof.

In the implementation of FIG. 7, the CPU 702 and the GPU 704 are formed and combined on a single silicon die or package to provide a unified programming and execution environment. This environment enables the GPU 704 to be used as fluidly as the CPU 702 for some programming tasks. In other implementations, the CPU 702 and the GPU 704 are formed separately and mounted on the same or different substrates. It should be appreciated that processing device 700, in at least some implementations, includes more or fewer components than illustrated in FIG. 7. For example, the processing device 700, in at least some implementations, additionally includes one or more input interfaces, non-volatile storage, one or more output interfaces, network interfaces, and one or more displays or display interfaces.

As illustrated in FIG. 7, the processing device 700 also includes a system memory 706, an operating system (OS) 708, a communications infrastructure 710, one or more applications 712. Access to system memory 706 is managed by a memory controller (not shown) coupled to system memory 706. For example, requests from the CPU 702 or other devices for reading from or for writing to system memory 706 are managed by the memory controller. In some implementations, the one or more applications 712 include various programs or commands to perform computations that are also executed at the CPU 702. The CPU 702 sends selected commands for processing at the GPU 704. The operating system 708 and the communications infrastructure 710 are discussed in greater detail below.

Within the processing device 700, the system memory 706 includes non-persistent memory, such as dynamic random-access memory (not shown). In various implementations, the system memory 706 stores processing logic instructions, constant values, variable values during execution of portions of applications or other processing logic, or other desired information. For example, in various implementations, parts of control logic to perform one or more operations on CPU 702 reside within system memory 706 during execution of the respective portions of the operation by CPU 702. During execution, respective applications, operating system functions, processing logic commands, and system software reside in system memory 706. Control logic commands that are fundamental to operating system 708 generally reside in system memory 706 during execution. In some implementations, other software commands (e.g., a set of instructions or commands used to implement a device driver 714) also reside in system memory 706 during execution of processing device 700.

The input-output memory management unit (IOMMU) 716 is a multi-context memory management unit. As used herein, context is considered the environment within which the kernels execute and the domain in which synchronization and memory management is defined. The context includes a set of devices, the memory accessible to those devices, the corresponding memory properties, and one or more command queues used to schedule execution of a kernel(s) or operations on memory objects. The IOMMU 716 includes logic to perform virtual to physical address translation for memory page access for devices, such as the GPU 704. In some implementations, the IOMMU 716 also includes, or has access to, a translation lookaside buffer (TLB) (not shown). The TLB is implemented in a content addressable memory (CAM) to accelerate translation of logical (i.e., virtual) memory addresses to physical memory addresses for requests made by the GPU 704 for data in system memory 706.

In various implementations, the communications infrastructure 710 interconnects the components of the processing device 700. Communications infrastructure 710 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some implementations, communications infrastructure 710 also includes an Ethernet network or any other suitable physical communications infrastructure that satisfies an application's data transfer rate requirements. Communications infrastructure 710 also includes the functionality to interconnect components, including components of the processing device 700.

A driver, such as device driver 714, communicates with a device (e.g., GPU 704) through an interconnect or the communications infrastructure 710. When a calling program invokes a routine in the device driver 714, the device driver 714 issues commands to the device. Once the device sends data back to the device driver 714, the device driver 714 invokes routines in an original calling program. In general, device drivers are hardware-dependent and operating-system-specific to provide interrupt handling required for any necessary asynchronous time-dependent hardware interface. In some implementations, a compiler 718 is embedded within device driver 714. The compiler 718 compiles source code into program instructions as needed for execution by the processing device 700. During such compilation, the compiler 718 applies transforms to program instructions at various phases of compilation. In other implementations, the compiler 718 is a standalone application. In various implementations, the device driver 714 controls operation of the GPU 704 by, for example, providing an application programming interface (API) to software (e.g., applications 712) executing at the CPU 702 to access various functionality of the GPU 704.

The CPU 702 includes (not shown) one or more of a control processor, field-programmable gate array (FPGA), application-specific integrated circuit (ASIC), or digital signal processor (DSP). The CPU 702 executes at least a portion of the control logic that controls the operation of the processing device 700. For example, in various implementations, the CPU 702 executes the operating system 708, the one or more applications 712, and the device driver 714. In some implementations, the CPU 702 initiates and controls the execution of the one or more applications 712 by distributing the processing associated with one or more applications 712 across the CPU 702 and other processing resources, such as the GPU 704.

The GPU 704 executes commands and programs for selected functions, such as graphics operations and other operations that are particularly suited for parallel processing. In general, GPU 704 is frequently used for executing graphics pipeline operations, such as pixel operations, geometric computations, and rendering an image to a display. In some implementations, GPU 704 also executes compute processing operations (e.g., those operations unrelated to graphics such as video operations, physics simulations, computational fluid dynamics, etc.), based on commands or instructions received from the CPU 702. For example, such commands include special instructions that are not typically defined in the instruction set architecture (ISA) of the GPU 704. In some implementations, the GPU 704 receives an image geometry representing a graphics image, along with one or more commands or instructions for rendering and displaying the image. In various implementations, the image geometry corresponds to a representation of a two-dimensional (2D) or three-dimensional (3D) computerized graphics image.

In various implementations, the GPU 704 includes one or more compute units, such as one or more processing cores 720 (illustrated as 720-1 and 720-2) that include one or more single-instruction multiple-data (SIMD) units 722 (illustrated as 722-1 to 722-4) that are each configured to execute a thread concurrently with execution of other threads in a wavefront by other SIMD units 722, e.g., according to a SIMD execution model. The SIMD execution model is one in which multiple processing elements share a single program control flow unit and program counter and thus execute the same program but are able to execute that program with different data. The processing cores 720 are also referred to as shader cores or streaming multi-processors (SMXs). The number of processing cores 720 implemented in the GPU 704 is configurable. Each processing core 720 includes one or more processing elements such as scalar and or vector floating-point units, arithmetic and logic units (ALUs), and the like. In various implementations, the processing cores 720 also include special-purpose processing units (not shown), such as inverse-square root units and sine/cosine units.

Each of the one or more processing cores 720 executes a respective instantiation of a particular work item to process incoming data, where the basic unit of execution in the one or more processing cores 720 is a work item (e.g., a thread). Each work item represents a single instantiation of, for example, a collection of parallel executions of a kernel invoked on a device by a command that is to be executed in parallel. A work item executes at one or more processing elements as part of a workgroup executing at a processing core 720.

The GPU 704 issues and executes work-items, such as groups of threads executed simultaneously as a "wavefront", on a single SIMD unit 722. Wavefronts, in at least some implementations, are interchangeably referred to as warps, vectors, or threads. In some implementations, wavefronts include instances of parallel execution of a shader program, where each wavefront includes multiple work items that execute simultaneously on a single SIMD unit 722 in line with the SIMD paradigm (e.g., one instruction control unit executing the same stream of instructions with multiple data). A scheduler 724 is configured to perform operations related to scheduling various wavefronts on different processing cores 720 and SIMD units 722 and performing other operations to orchestrate various tasks on the GPU 704.

To reduce latency associated with off-chip memory access, various GPU architectures include a memory cache hierarchy (not shown) including, for example, L1 cache and a local data share (LDS). The LDS is a high-speed, low-latency memory private to each processing core 720. In some implementations, the LDS is a full gather/scatter model so that a workgroup writes anywhere in an allocated space.

The parallelism afforded by the one or more processing cores 720 is suitable for graphics-related operations such as pixel value calculations, vertex transformations, tessellation, geometry shading operations, and other graphics operations. A graphics processing pipeline 726 accepts graphics processing commands from the CPU 702 and thus provides computation tasks to the one or more processing cores 720 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD units 722 in the one or more processing cores 720 to process such data elements in parallel. As referred to herein, for example, a compute kernel is a function containing instructions declared in a program and executed on an accelerated processing device (APD) processing core 720. This function is also referred to as a kernel, a shader, a shader program, or a program.

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:

deriving, from a key derivation key, a first data encryption key shared among a plurality of nodes, wherein the first data encryption key is generated based on identifiers of a corresponding node pair of the plurality of nodes such that the first data encryption key is unique to communication between the corresponding node pair; and encrypting a data packet transmitted between the corresponding node pair using the first data encryption key.

2. The method of claim 1, further comprising:

transmitting, by a first node in the node pair, the encrypted data packet for receipt by a second node in the node pair.

3. The method of claim 1, wherein deriving the first data encryption key comprises:

invoking, by a key derivation function, a first iteration of a pseudo-random function, the first iteration of the pseudo-random function taking as input a key derivation key, first iteration-dependent input data, and fixed input data, wherein the key derivation key is a global security association encryption key shared by the plurality of nodes in a computing cluster; and responsive to invoking the first iteration of the pseudo-random function, generating a first set of keying material.

4. The method of claim 3, wherein deriving the first data encryption key further comprises generating the first data encryption key based on the first set of keying material.

5. The method of claim 3, wherein deriving the first data encryption key further comprises:

invoking, by the key derivation function, at least a second iteration of the pseudo-random function, the second iteration of the pseudo-random function taking as input the key derivation key, second iteration-dependent input data, and the fixed input data;

responsive to invoking the second iteration of the pseudo-random function, generating at least a second set of keying material; and deriving the first data encryption key based on the first set of keying material and the second set of keying material.

6. The method of claim 5, wherein the first iteration-dependent input data and the second iteration-dependent input data each comprise a different counter value that is incremented after each iteration of the pseudo-random function, and wherein the fixed input data of the first iteration and the second iteration comprises a source identifier, a destination identifier, and a transmit sequence number.

7. The method of claim 6, further comprising:

applying a masking function to the first iteration-dependent input data, the second iteration-dependent input data, and the fixed input data.

8. The method of claim 3, wherein the pseudo-random function is an Advanced Encryption Standard (AES) cipher-based message authentication code (CMAC).

9. The method of claim 1, further comprising:

responsive to a key rolling event having occurred, rolling from the first data encryption key to a second data encryption key.

10. A method comprising:

invoking a first iteration of a pseudo-random function, the first iteration taking as input a key derivation key, first iteration-dependent input data, and fixed input data;

responsive to invoking the first iteration of the pseudo-random function, generating a first set of keying material;

invoking at least a second iteration of the pseudo-random function, the second iteration taking as input the key derivation key, second iteration-dependent input data, and the fixed input data;

responsive to invoking the second iteration of the pseudo-random function, generating at least a second set of keying material; and generating a first data encryption key based on the first set of keying material and the second set of keying material.

11. The method of claim 10, wherein the pseudo-random function is implemented by a key derivation function.

12. The method of claim 10, wherein the key derivation key is a global security association encryption key shared by a plurality of nodes in a computing cluster.

13. The method of claim 10, further comprising:

encrypting a data packet using the first data encryption key.

14. The method of claim 10, wherein the first iteration-dependent input data and the second iteration-dependent input data each comprise a different counter value that is incremented after each iteration of the pseudo-random function, and wherein the fixed input data of the first iteration and the second iteration comprises a source identifier, a destination identifier, and a transmit sequence number.

15. The method of claim 14, further comprising:

applying a masking function to the first iteration-dependent input data, the second iteration-dependent input data, and the fixed input data for each of the first iteration and the second iteration of the pseudo-random function.

16. The method of claim 10, further comprising:

responsive to a key rolling event having occurred, rolling from the first data encryption key to a second data encryption key.

17. A computing node comprising:

a key generating circuit to generate, from a key derivation key shared among a plurality of nodes, a first data encryption key, wherein the first data encryption key is generated based on identifiers of a node pair including the computing node and another node of the plurality of nodes such that the first data encryption key is unique to communication between the node pair; and an encryption circuit to encrypt a data packet using the first data encryption key.

18. The computing node of claim 17, wherein the key generating circuit is to generate the first data encryption key by:

invoking, by a key derivation function of the key generating circuit, a first iteration of a pseudo-random function, the first iteration of the pseudo-random function taking as input the key derivation key, first iteration-dependent input data, and fixed input data, wherein the key derivation key is a global security association encryption key configured to be shared by the plurality of nodes; and responsive to invoking the first iteration of the pseudo-random function, generating a first set of keying material.

19. The computing node of claim 18, wherein the key generating circuit is to generate the first data encryption key based on the first set of keying material.

20. The computing node of claim 18, wherein the key generating circuit is to generate the first data encryption key by:

invoking, by the key derivation function, at least a second iteration of the pseudo-random function, the second iteration of the pseudo-random function taking as input the key derivation key, second iteration-dependent input data, and the fixed input data;

responsive to invoking the second iteration of the pseudo-random function, generating at least a second set of keying material; and generating the first data encryption key based on the first set of keying material and the second set of keying material.

21. The computing node of claim 20, wherein the first iteration-dependent input data and the second iteration-dependent input data each comprise a different counter value that is incremented after each iteration of the pseudo-random function, and wherein the fixed input data of the first iteration and the second iteration comprises a source identifier, a destination identifier, and a transmit sequence number.

22. The computing node of claim 17, further comprising:

a key rolling event detector to detect a key rolling event, wherein responsive to the key rolling event detector detecting the key rolling event, the encryption circuit is further to roll from the first data encryption key to a second data encryption key.

* * * * *